(12) United States Patent
Duenas et al.

(10) Patent No.: US 10,621,731 B1
(45) Date of Patent: Apr. 14, 2020

(54) APPARATUS AND METHOD FOR EFFICIENT MOTION ESTIMATION FOR DIFFERENT BLOCK SIZES

(71) Applicant: NGCodec Inc., Sunnyvale, CA (US)

(72) Inventors: Alberto Duenas, Mountain View, CA (US); Frank Bossen, Toronto (CA)

(73) Assignee: NGCodec Inc., Sunnyvale, CA (US)

( * ) Notice: Subject to any disclaimer, the term of this patent is extended or adjusted under 35 U.S.C. 154(b) by 56 days.

(21) Appl. No.: 15/601,818

(22) Filed: May 22, 2017

Related U.S. Application Data

(60) Provisional application No. 62/350,059, filed on Jun. 14, 2016, provisional application No. 62/343,585, filed on May 31, 2016.

(51) Int. Cl.

| | |
|---|---|
| *H04N 19/513* | (2014.01) |
| *H04N 19/57* | (2014.01) |
| *G06T 7/20* | (2017.01) |
| *G06T 7/194* | (2017.01) |
| *H04N 5/91* | (2006.01) |
| *G06K 9/00* | (2006.01) |
| *H04N 19/196* | (2014.01) |
| *H04N 19/48* | (2014.01) |
| *H04N 19/543* | (2014.01) |

(52) U.S. Cl.
CPC ............. *G06T 7/20* (2013.01); *H04N 19/513* (2014.11); *H04N 19/57* (2014.11); *G06K 9/00543* (2013.01); *G06K 9/00624* (2013.01); *G06K 9/00765* (2013.01); *G06T 7/194* (2017.01); *H04N 5/91* (2013.01); *H04N 19/196* (2014.11); *H04N 19/198* (2014.11); *H04N 19/48* (2014.11); *H04N 19/543* (2014.11)

(58) Field of Classification Search
CPC ........ G06T 7/20; H04N 19/513; H04N 19/57; H04N 19/196
See application file for complete search history.

(56) References Cited

U.S. PATENT DOCUMENTS

| | | | |
|---|---|---|---|
| 6,738,169 B1 * | 5/2004 | Nakase | H04N 1/64 358/445 |
| 10,070,128 B2 * | 9/2018 | Ugur | H04N 19/11 |
| 2002/0093588 A1 * | 7/2002 | Dantwala | H04N 7/0112 348/459 |
| 2008/0126278 A1 * | 5/2008 | Bronstein | H04N 19/176 706/17 |
| 2008/0240242 A1 * | 10/2008 | Lainema | H04N 19/52 375/240.16 |
| 2009/0109342 A1 * | 4/2009 | Heng | H04N 19/513 348/699 |

(Continued)

*Primary Examiner* — Irfan Habib
(74) *Attorney, Agent, or Firm* — Cooley LLP

(57) ABSTRACT

A hardware video encoder includes a first inter-picture prediction search processor to perform at least one coarse search at a designated block size. The at least one coarse search utilizes a down-sampled version of an image to determine motion vectors. A second inter-picture prediction search processor performs motion vector refinement searches on pixels of the image for multiple block sizes. Searches of at least one block size utilize the motion vectors. A third inter-picture prediction search processor performs fractional pixel motion vector refinement searches on interpolated values of the pixels of the image for multiple block sizes in parallel.

12 Claims, 6 Drawing Sheets

(56) References Cited

U.S. PATENT DOCUMENTS

| | | | | |
|---|---|---|---|---|
| 2009/0168883 A1* | 7/2009 | Lu | ............... | H04N 19/139 |
| | | | | 375/240.16 |
| 2009/0245374 A1* | 10/2009 | Hsu | ............... | H04N 19/105 |
| | | | | 375/240.16 |
| 2011/0158320 A1* | 6/2011 | Zheng | ............... | H04N 19/50 |
| | | | | 375/240.16 |
| 2011/0293012 A1* | 12/2011 | Au | ............... | H04N 19/52 |
| | | | | 375/240.16 |
| 2012/0275518 A1* | 11/2012 | Kadono | ............... | H04N 19/61 |
| | | | | 375/240.14 |
| 2013/0016783 A1* | 1/2013 | Kim | ............... | H04N 19/176 |
| | | | | 375/240.13 |
| 2013/0243091 A1* | 9/2013 | Ye | ............... | H04N 19/176 |
| | | | | 375/240.16 |
| 2014/0253681 A1* | 9/2014 | Zhang | ............... | H04N 19/597 |
| | | | | 348/43 |
| 2016/0261882 A1* | 9/2016 | Chien | ............... | H04N 19/523 |
| 2018/0262754 A1* | 9/2018 | Komi | ............... | H04N 19/139 |

* cited by examiner

APPARATUS AND METHOD FOR EFFICIENT MOTION ESTIMATION FOR DIFFERENT BLOCK SIZES

CROSS-REFERENCE TO RELATED INVENTION

This application claims priority to U.S. Provisional Patent Application Ser. No. 62/350,059, filed Jun. 14, 2016, and U.S. Provisional Patent Application Ser. No. 62/343,585, filed May 31, 2016, the contents of each application are incorporated herein by reference.

This application is also related to commonly owned U.S. Ser. No. 15/199,579, filed Jun. 30, 2016.

FIELD OF THE INVENTION

This invention relates generally to hardware based video signal processing. More particularly, this invention relates to techniques for efficient motion estimation for different block sizes.

BACKGROUND OF THE INVENTION

High Efficiency Video Coding (HEVC) is a video compression standard. In HEVC, the basic processing unit is called a coding tree unit (CTU) and it can be as large as 64×64 luma samples. A CTU can be split into multiple coding units (CU) in a quad-tree fashion; these CUs can have sizes varying from 8×8 to 64×64. Each CU can be coded either as an intra-picture prediction (INTRA) CU or as an inter-picture prediction (INTER) CU. Thus, the CU is the basic unit for forming the prediction.

When a CU is determined as INTER, the corresponding CU can be sub-divided into prediction units (PU) or can stay as a single unit. There are several PU division types: one is dividing the CU horizontally into two rectangular PUs, another division type is dividing vertically into two rectangular PUs, or dividing into four equal-sized square PUs.

A motion vector is associated with each PU. The motion vector for each PU is usually determined using a motion estimation technique. Hierarchical Motion Estimation is a motion estimation (ME) algorithm using a block matching approach to find a good motion vector for each of the blocks (PUs) with a lower complexity than a Full Search (FS) algorithm, which considers all the candidates available by searching all the points in the search area. Generally, fast algorithms with reduced computational complexity show degraded performance compared to a FS. Thus, there is the need for a fast algorithm with reduced computational complexity, but which still accomplishes high compression efficiency while maintaining sufficient quality.

The main idea of Hierarchical Motion Estimation is to start performing motion estimation searches at a lower image resolution than the target resolution image and increase the accuracy at different steps. The lower resolution image represents the characteristics of the image that is under analysis.

To better understand Hierarchical ME, consider an example of searching a motion vector for a 32×32 block. For a block size of 32×32, initial motion estimation is performed by down-sampling by a factor of 4 the original image 32×32 block. This creates an 8×8 block that is searched in the down-sampled reference frame. This results in a motion vector with four-pixel accuracy because of the 4× down-sampling.

Assume that the motion vector from this step is found to be (12, 8), where 12 is the horizontal displacement and 8 is the vertical displacement. After this step the 4-pixel accurate motion vector could undergo a refinement search step where candidate 2-pixel-accurate motion vectors around the initial 4-pixel-accurate motion vector are evaluated. More specifically, the following motion vectors are searched for the above example: (10,6), (12,6), (14,6), (10,8), (12,8), (14,8), (10,10), (12,10), (14,10). At this refinement step, the resolution of the block being searched is increased to 16×16. The block is obtained by a 2× down-sampling process applied to the original image 32×32 block. Similarly, the resolution is increased to full-pixel, half-pixel and quarter-pixel accuracies and the final motion vector is found for the block with quarter-pixel accuracy.

In order to determine motion information for each PU within the CTU, the motion estimation process needs to be done for different block sizes. If motion estimation is done exhaustively for all block sizes, the additional complexity becomes very significant.

Therefore, novel methods need to be developed where motion information for different block sizes of the CTU is determined with high coding efficiency but with low complexity.

SUMMARY OF THE INVENTION

A hardware video encoder includes a first inter-picture prediction search processor to perform at least one coarse search at a designated block size. The at least one coarse search utilizes a down-sampled version of an image to determine motion vectors. A second inter-picture prediction search processor performs motion vector refinement searches on pixels of the image for multiple block sizes. Searches of at least one block size utilize the motion vectors. A third inter-picture prediction search processor performs fractional pixel motion vector refinement searches on interpolated values of the pixels of the image for multiple block sizes in parallel.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
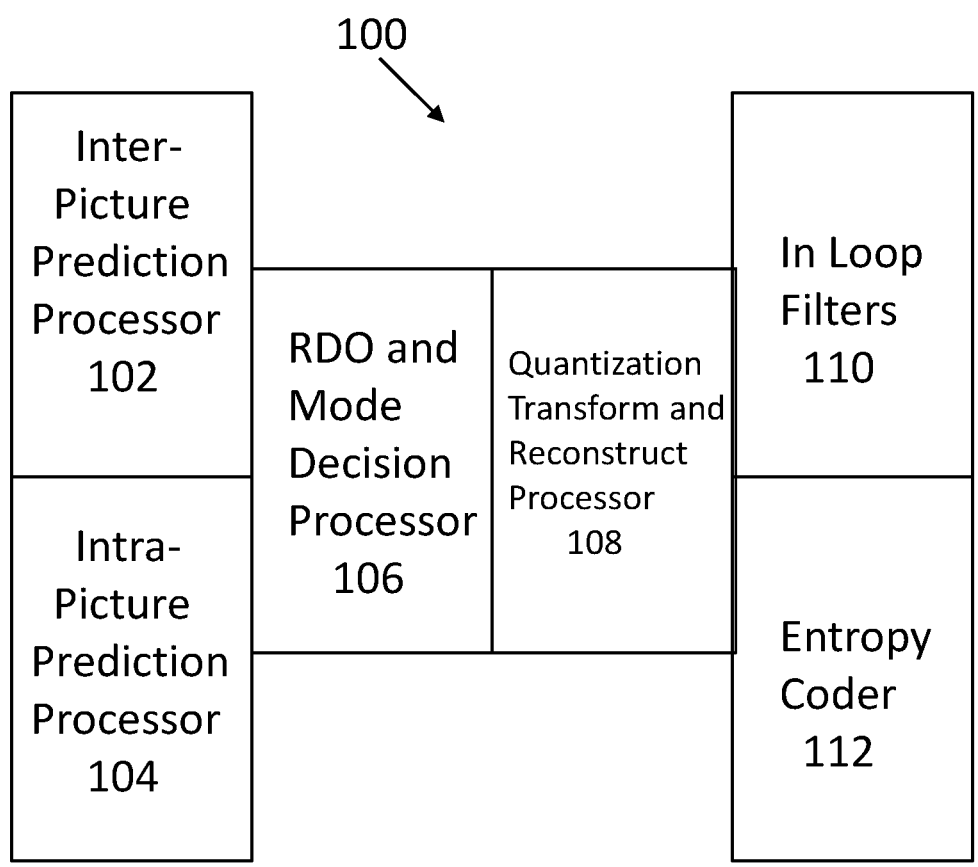
FIG. 1 illustrates a hardware based encoder.

FIG. 1 illustrates an encoder architecture 100. Inter-picture prediction search processor 102 executes a search mechanism to determine parameters that can be used to predict the information of the current image from the information available from a previously processed image. The intra-picture prediction search processor 104 executes a prediction search mechanism to determine parameters that can be used to predict information about a current image from other information available within the current image. Inter-picture prediction search processor 102 and intra-picture prediction search processor 104 are vertically aligned to denote that they may operate in parallel.

The RDO and mode decision processor 106 selects a CTU candidate from all available CTU candidates. In particular, the processor selects which way inter and intra predictions are combined and what CU sizes are to be used for encoding. Efficient encoders rely on rate-distortion metrics to make decisions such as CU size determination. Given a number of choices for a CU size, an encoder estimates rate and distortion for each choice. The rate is generally expressed as a number of bits needed to encode the choice. The distortion can be expressed as a sum of squared differences between a block to be coded and its reconstructed version after compression. While it is possible to compute exact numbers when estimating rate and distortion, such an approach is impractical in most scenarios, in particular for real-time encoders. This impracticality stems from the high computational complexity required to compute the estimates. In practice, computationally efficient approximations are used. A rate estimate R and a distortion estimate D are typically combined into a single rate-distortion cost estimate C using a linear combination such as $\lambda R+D$ where $\lambda$ is a weighting factor called a Lagrange multiplier. This weighting factor reflects the desired balance between rate and distortion and may be adjusted according to a target bit rate. Once costs are determined for each of the choices available to the encoder, the one with the lowest cost is picked. This process is commonly referred to as rate-distortion optimization (RDO).

Processor 108 performs Quantization, Transform and Reconstruct operations. The in loop filters processor 110 reduces the distortion introduced by the encoding process. The entropy coder processor 112 extracts mathematical redundancy that may still exist in the data before it is transmitted to a decoder. Processors 110 and 112 may operate in parallel.

The encoder 100 is based on a pipelined hardware design. Most of the processing of the video signals is performed by dedicated hardware processors that are optimized for the associated task. That is, each dedicated hardware processor is a semiconductor based processing block with a gate configuration to implement the associated task. Software based processing is inadequate to meet the computational requirements for motion estimation.

Each processor in the pipeline processes one complete CTU before sending it to the next processor in the pipeline. Processors that are vertically aligned in FIG. 1 may operate in parallel. When clocking at 200 MHz and processing a high-definition picture (1920 pixels wide and 1080 pixels high) about 6400 clock cycles are available to each processor to complete the processing of each CTU. The processors in the pipeline are synchronous and each uses the 6400 clock cycles to process each CTU. For power saving purposes a processor may be largely shut down for many of those cycles if the work on a given CTU is finished early.

Figure 2:
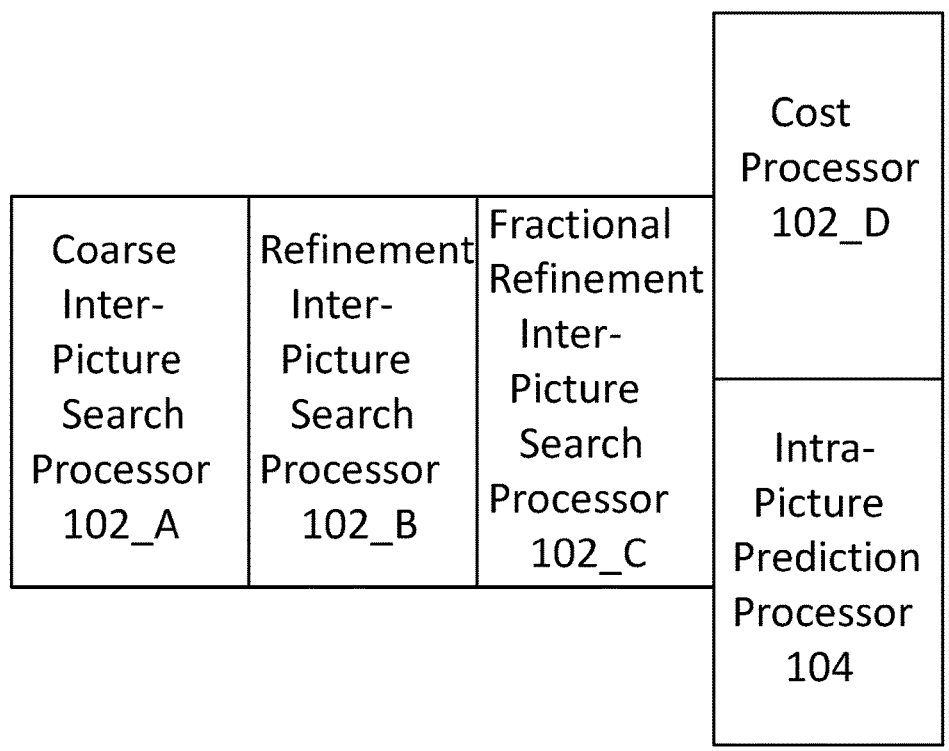
FIG. 2 illustrates staged inter and intra processing performed in accordance with an embodiment of the invention.

FIG. 2 is a more detailed characterization of the inter-picture prediction search processor 102. The inter-picture prediction search processor 102 has a coarse inter-picture search processor 102_A followed by a refinement inter-picture search processor 102_B, which is followed by a fractional refinement inter-picture search processor 102_C. An inter cost processor 102_D may operate in parallel with the intra-picture prediction search processor 104. The invention is directed to processors 102_A, 102_B and 102_C.

The invention is related to the motion estimation process of a video encoder. More specifically, this invention is related to determining motion vector information for different block sizes within a CTU without performing an exhaustive search for all the PU sizes. By using this invention, an HEVC encoder derives motion vectors for different block sizes in a CTU without the need to perform full motion estimation for all block sizes.

Figure 3:
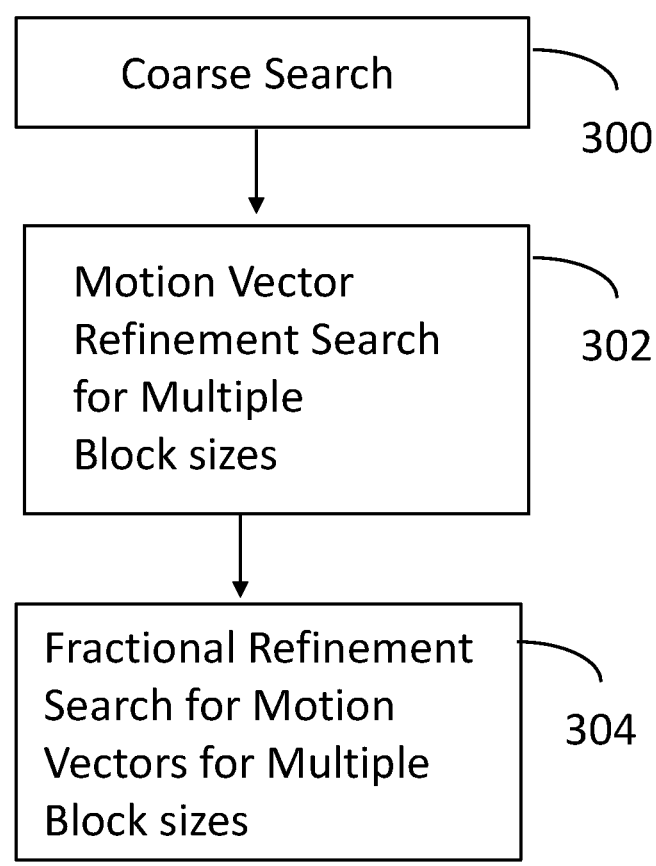
FIG. 3 illustrates processing performed in accordance with an embodiment of the invention.
Figure 7:
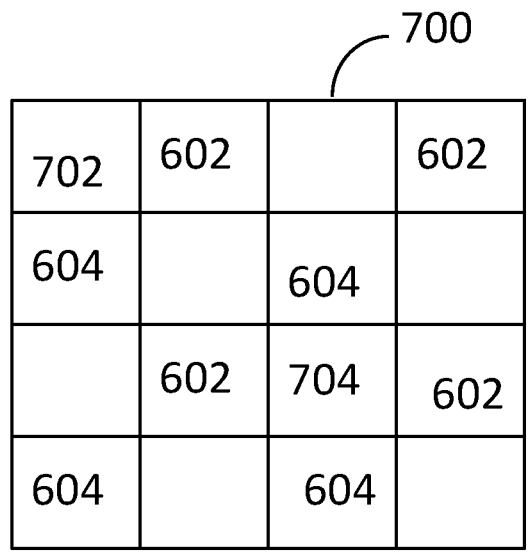
FIG. 7 illustrates selective block processing for 64×64 blocks performed in accordance with an embodiment of the invention.

FIG. 3 illustrates processing operations associated with the invention. Initially, a coarse search is performed 300. This search may be performed by inter search processor 102_A. A motion estimation search is performed using a hierarchical motion estimation algorithm, as described in the Background section, within a search window and for a given block size. In one embodiment, the block size is 16×16. This produces a motion vector (or possible several best candidates) for each of the non-overlapping blocks of the given size within the CTU. FIG. 7 depicts 16 non-overlapping 16×16 blocks within a CTU for each of which a motion vector is produced. The accuracy of the motion vectors may be limited to 2-pixel accuracy. In an alternate embodiment, multiple block sizes are searched. For example, the block sizes may be 16×16 and 32×32. The additional search on a larger block size (e.g., 32×32) may be particularly beneficial for low bit rate applications.

Next, a motion vector refinement search is performed for multiple block sizes 302. This may be performed by processor 102_B. The multiple block sizes may include 8×8, 16×16, 32×32 and 64×64. In particular, motion vectors from the coarse search 300 are used as search centers for all block sizes. The motion vectors may have a higher accuracy level than in the previous step, for example, using 1-pixel accuracy.

Next, a fractional-pixel refinement search is performed for motion vectors for multiple block sizes 304. This may be performed by processor 102_C. That is, a refinement search is performed for all the block sizes and is centered around the motion vectors found in search 302. The output of the fractional-pixel refinement search provides motion vectors with, for example, quarter-pixel accuracy, which is accuracy specified in the HEVC specification. Any number of different algorithms may be used for the refinement search. For example the 8 motion vectors centered around a motion vector obtained in 302 and lying on the half-pixel grid may be searched first and a best half-pixel-accurate motion vector may be selected from these 8, followed by the 8 motion vectors centered around the best half-pixel-accurate vector and lying on the quarter-pel grid. Alternatively, the 24 vectors centered around a motion vector obtained in 302 and lying on the quarter-pixel grid may be searched. Operation 304 may be implemented as four parallel processes, where fractional refinement is performed in parallel for block sizes 8×8, 16×16, 32×32 and 64×64. Interpolation of the reference image is necessary to evaluate motion vectors that feature sub-pixel accuracy. The HEVC specification defines several 7- and 8-tap interpolation filters to construct a prediction associated with motion that are not integer multiples of pixels. The same interpolation filters may be used in this fractional-pixel refinement search. Shorter interpolation filters, such as 4-tap filters may also be used in this search in order to reduce implementation complexity. For example, these 4-tap filters may be the ones that the HEVC specification defines for chroma sample interpolation.

Figure 4:
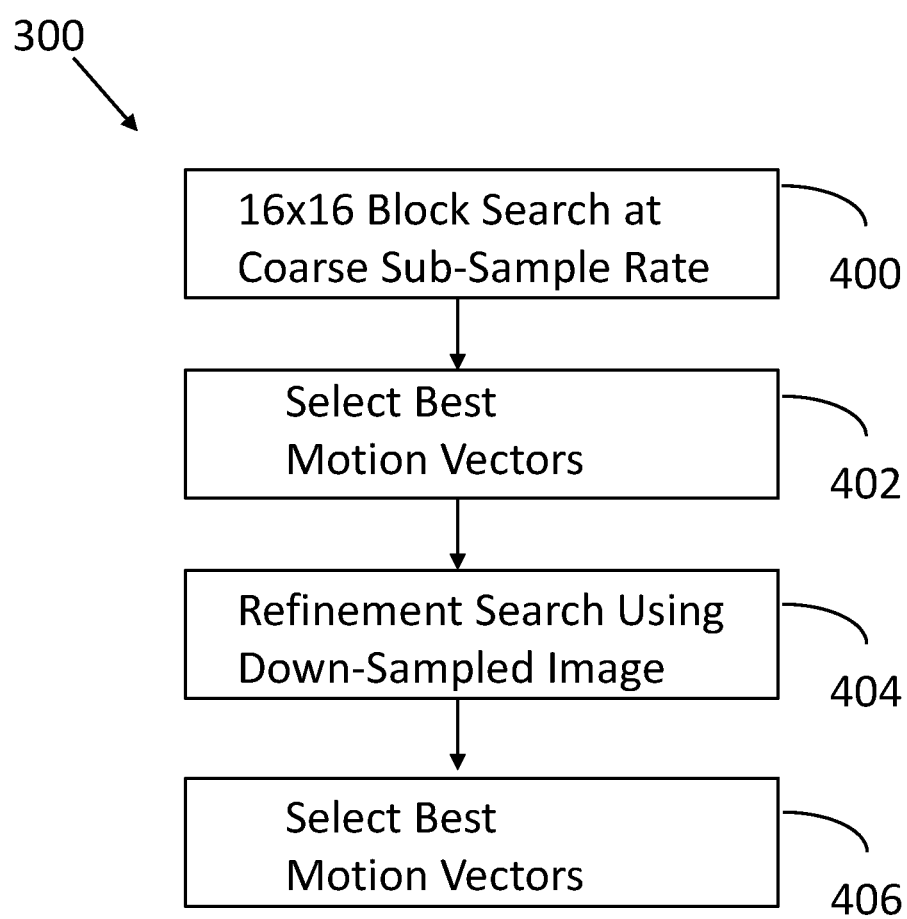
FIG. 4 illustrates coarse search operations performed in accordance with an embodiment of the invention.

These operations are more fully appreciated with reference to FIG. 4. In particular, FIG. 4 more fully characterizes operations associated with the coarse search 300. Initially, a 16×16 block search is performed using a down-sampled image. For example, the down-sampling ratio may be 4:1. For example, a 16×16 block is down-sampled to a 4×4 block for the search. The best motion vectors are selected 402 based upon this search. That is, the motion vectors with the lowest rate-distortion costs are selected so that they can be used in subsequent processing. The rate-distortion costs are a combination of rate and distortion estimates. The distortion estimate may be based on the sum of absolute difference between a block to be encoded and the motion compensated prediction associated with a given motion vector. The rate estimate may be based on the difference between a candidate motion vector and a motion vector predictor. While the HEVC standard features an efficient but complex motion vector prediction algorithm, a much simpler prediction algorithm may be used here where an estimated motion vector associated with the block to the left of the current block may be used as a predictor. For better accuracy a logarithm (in base 2) function may be applied to the motion vector difference to obtain an estimated rate. This mimics the entropy coding method that the HEVC specification applies to the coding of motion vector differences.

Next, a refinement search is performed using a refined down-sampled image 404. For example, the refined down-sampling ratio may be 2:1 where a 16×16 block is down-sampled to an 8×8 block for the search. The motion vector information obtained in block 402 may be used for these searches. The best motion vectors are selected 406 based upon the updated search. Once again, the motion vectors with the lowest rate-distortion values are selected so that they can be used in subsequent processing.

Figure 5:
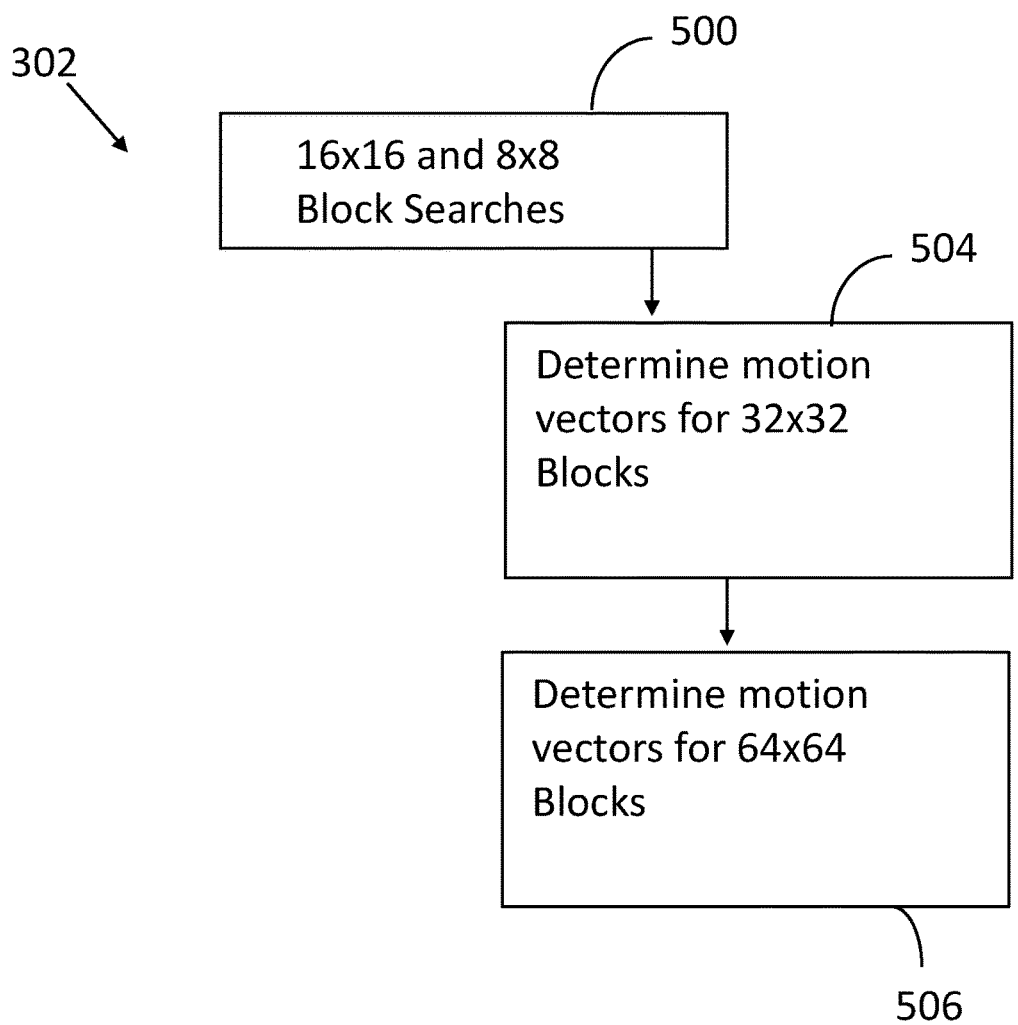
FIG. 5 illustrates candidate refinement operations performed in accordance with an embodiment of the invention.

FIG. 5 more fully characterizes the candidate refinement operation 302. Initially, searches for 16×16 and 8×8 blocks are performed for all pixels 500. Thus, the search has hierarchically progressed through several down-sampled searches of increasing refinement to this search where all pixels are considered. The search 500 uses the motion vector information from the coarse search 300. Search is conducted around multiple centers. The multiple search centers for a given 16×16 block may include motion vectors derived for various 16×16 block locations in the coarse search. For example, there may be 5 search centers for a given 16×16 block using the following motion vectors derived in coarse search 300: the motion vector associated with the given 16×16 block, the motion vectors associated the 16×16 blocks located at positions 702 and 704 within the CTU (see FIG. 7) and the motion vectors associated with the 16×16 blocks located at positions 602 and 604 (see FIG. 6) within the 32×32 block that includes the given 16×16 block. Alternatively, if the coarse search 300 produces motion vectors for block sizes 16×16 and 32×32, the 5 search centers for a given 16×16 block are: the motion vector associated with the given 16×16 block, and the motion vectors from each of the four 32×32 blocks within the CTU. Searches for 16×16 and 8×8 blocks are performed simultaneously. More precisely searches for the four 8×8 blocks contained in a 16×16 block are performed at the same time as the 16×16 block searches. Distortion is computed for each of the 8×8 blocks for the purpose of determining the rate-distortion cost for each 8×8 block and the distortions are then added for determining the rate-distortion cost for the 16×16 block. Motion vectors with the lowest rate-distortion values are selected so that they can be used in subsequent processing.

Next motion vectors for 32×32 blocks are determined 504. A 32×32 block contains four underlying 16×16 blocks. When a same motion vector is evaluated for all of the four underlying 16×16 blocks, the distortions for each of the four blocks can be summed to obtain the distortion for the 32×32 block. Motion vectors for 32×32 blocks may thus be evaluated without requiring additional sample-based distortion computations. In the example above with 5 search centers, the last 4 search centers are common to all 16×16 blocks within a given 32×32 block. The vectors around these 4 search centers may thus be readily evaluated for 32×32 blocks in addition to 16×16 blocks. Motion vectors with the lowest rate-distortion values are selected so that they can be used in subsequent processing.

Next motion vectors for 64×64 blocks are determined 506. A 64×64 block contains sixteen underlying 16×16 blocks. When a same motion vector is evaluated for all of the sixteen underlying 16×16 blocks, the distortions for each of the sixteen blocks can be summed to obtain the distortion for the 64×64 block. Motion vectors for 64×64 blocks may thus be evaluated without requiring additional sample-based distortion computations. In the example above with 5 search centers, the second and third search centers are common to all 16×16 blocks within a given 64×64 block. The vectors around these 2 search centers may thus be readily evaluated for 64×64 blocks in addition to 16×16 blocks. Motion vectors with the lowest rate-distortion values are selected so that they can be used in subsequent processing.

Figure 6:
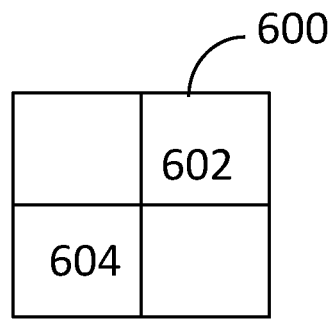
FIG. 6 illustrates selective block processing for 32×32 blocks performed in accordance with an embodiment of the invention.

FIG. 6 illustrates a 16×16 block 600. There are four such blocks to form a 32×32 block. Motion vectors used for search refinement are taken from the upper right corner block 602 and the lower left corner block 604.

FIG. 7 illustrates a 16×16 block 700. There are sixteen such blocks to form a 64×64 block. Motion vectors used for search refinement are taken from the upper left corner block 702 and the block at the third row, third position from the left 704. The search refinement blocks of FIG. 6 are also shown in FIG. 7 in the context of the larger 64×64 block.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:
1. A hardware video encoder, comprising:
a first inter-picture prediction search processor to perform a coarse search at a designated block size to determine motion vectors, wherein the coarse search includes a first coarse search using a first down-sampled version of the image and a second coarse search using a second down-sampled version of the image that is less coarse than the first down-sampled version of the image;
a second inter-picture prediction search processor to perform motion vector refinement searches on pixels of the image for multiple block sizes, wherein searches of at least one block size utilize the motion vectors; and a third inter-picture prediction search processor to perform fractional pixel motion vector refinement searches on interpolated values of the pixels of the image for multiple block sizes in parallel.

2. The hardware video encoder of claim 1 wherein the designated block size is 16×16.

3. The hardware video encoder of claim 1 wherein the first down-sampled version of the image is down-sampled by a ratio of 4:1.

4. The hardware video encoder of claim 1 wherein second down-sampled version of the image is down-sampled by a ratio of 2:1.

5. The hardware video encoder of claim 1 wherein the second inter-picture prediction search processor initially performs 16×16 block size searches utilizing the motion vectors.

6. The hardware video encoder of claim 5 wherein the second inter-picture prediction search processor subsequently determines motion vectors for 32×32 blocks based on information gathered from the 16×16 block size searches.

7. The hardware video encoder of claim 1 wherein the interpolated values of the pixels of the image are generated using at least one 4-tap interpolation filter.

8. The hardware video encoder of claim 1 wherein the motion vectors have 2-pixel accuracy.

9. The hardware video encoder of claim 1 wherein output of the fractional pixel motion vector refinement searches provides motion vectors with quarter-pixel accuracy.

10. The hardware video encoder of claim 1 wherein the coarse search determines the motion vectors based upon a motion vector prediction mechanism that is less complex than the motion vector prediction mechanism specified by a High Efficiency Video Coding standard.

11. The hardware video encoder of claim 1 wherein a motion vector prediction mechanism relies upon motion vectors of an adjacent block.

12. The hardware video encoder of claim 1 wherein a motion vector prediction mechanism uses a logarithm function applied to motion vector differences to obtain an estimated rate distortion value.

\* \* \* \* \*